United States Patent
Ellicott

(10) Patent No.: US 9,551,401 B2
(45) Date of Patent: Jan. 24, 2017

(54) CONTINUOUSLY VARIABLE TRANSMISSION

(71) Applicant: Caterpillar Inc., Peoria, IL (US)

(72) Inventor: Gabriel J. Ellicott, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 206 days.

(21) Appl. No.: 14/461,701

(22) Filed: Aug. 18, 2014

(65) Prior Publication Data
US 2016/0047445 A1   Feb. 18, 2016

(51) Int. Cl.
| F16H 9/24 | (2006.01) |
|---|---|
| F16H 55/30 | (2006.01) |
| F16H 55/36 | (2006.01) |
| F16H 7/06 | (2006.01) |
| F16H 15/18 | (2006.01) |
| F16H 37/12 | (2006.01) |
| F16H 55/56 | (2006.01) |

(52) U.S. Cl.
CPC .............. *F16H 7/06* (2013.01); *F16H 15/18* (2013.01); *F16H 37/12* (2013.01); *F16H 55/56* (2013.01)

(58) Field of Classification Search
CPC ............ F16H 7/06; F16H 15/18; F16H 37/12; F16H 55/56
See application file for complete search history.

(56) References Cited

U.S. PATENT DOCUMENTS

| 5,984,814 A | 11/1999 | Davenport |
|---|---|---|
| 6,626,780 B2 | 9/2003 | Fragnito |
| 7,803,077 B1 | 9/2010 | Spaude |
| 8,360,912 B2 | 1/2013 | Klabisch et al. |
| 8,613,235 B2 | 12/2013 | Espinosa-Montalvo |
| 8,628,439 B2 | 1/2014 | Tay |

FOREIGN PATENT DOCUMENTS

| JP | 3381914 B1 | 3/2003 |
|---|---|---|
| KR | 2002-0052407 A | 7/2002 |

*Primary Examiner* — William E Dondero
*Assistant Examiner* — Robert T Reese
(74) *Attorney, Agent, or Firm* — Leydig, Voit & Mayer, Ltd.

(57) ABSTRACT

A continuously variable transmission (CVT) includes an input arrangement associated with an input shaft and an output arrangement associated with an output shaft. An input sprocket and an output sprocket are connected via a chain. An input cone member is connected to the input shaft, disposed within a central opening of the input sprocket, and frictionally engages an inner periphery of the input sprocket such that rotation of the input cone causes the input sprocket to rotate. An output cone member is connected to the output shaft, disposed within a central opening of the output sprocket, and frictionally engages an inner periphery of the output sprocket such that rotation of the output sprocket causes rotation of the output cone member.

20 Claims, 5 Drawing Sheets

CONTINUOUSLY VARIABLE TRANSMISSION

TECHNICAL FIELD

This patent disclosure relates generally to machines and, more particularly, to a continuously variable transmission for use in a vehicle powertrain.

BACKGROUND

Continuously variable transmission (CVT) arrangements in powertrains for use in vehicles such as cars and other machines are known. A typical CVT is a device that can assume almost an infinite number of effective gear ratios between maximum and minimum values between an input shaft and an output shaft of the powertrain in which the CVT is installed. In certain applications, this capability of the CVT allows the input shaft, for example, an engine, to operate at a constant speed while traction elements of the powertrain can rotate at variable speeds.

Various known CVT types include variable diameter-pulley (VDP) or Reeves-type, toroidal or roller-based, magnetic, infinitely variable, ratcheting, incremental, radial roller, cone roller, and other drive arrangement types. In certain drive arrangements, for example, a cone roller-type, a belt is disposed around portions of two cones, which are disposed in parallel to one another, with their bases on opposite sides. The belt is slidable over and frictionally engages the external surfaces of the cones such that rotation of one cone, for example, by the input shaft, rotates the other cone, which operates to drive the output shaft. Motion or translation of the belt along the two cones together results in a gear ratio being created therebetween.

Such and other known CVT drive arrangements usually have low power transmission efficiency, for example, less than about 90%, but are still widely used because they can provide a cost-effective power transmission solution and enable the engine to run at its most efficient revolutions per minute (RPM) for a range of vehicle speeds. Additionally, CVT arrangements also enable performance enhancement for the powertrain in which they are installed by allowing the engine to turn at the RPM at which it produces peak power. This is typically higher than the RPM that achieves peak efficiency. Finally, a CVT does not strictly require the presence of a clutch, which simplifies the powertrain.

SUMMARY OF THE DISCLOSURE

In one aspect, the disclosure describes a continuously variable transmission (CVT) that includes an input arrangement associated with an input shaft and an output arrangement associated with an output shaft. The CVT includes an input sprocket and an output sprocket connected to the input sprocket via a chain meshed with the input and output sprockets such that rotation of the input sprocket causes rotation of the output sprocket. An input cone member is connected to the input shaft, disposed within a central opening of the input sprocket, and frictionally engages an inner periphery of the input sprocket such that rotation of the input cone causes the input sprocket to rotate. An output cone member is connected to the output shaft, disposed within a central opening of the output sprocket, and frictionally engages an inner periphery of the output sprocket such that rotation of the output sprocket causes rotation of the output cone member.

In another aspect, the disclosure describes a continuously variable transmission (CVT) connected between an input shaft and an output shaft. The CVT includes a double-cone arrangement including an input conical member and an output conical member. The input and output conical members are disposed in parallel and have their respective bases on opposite ends such that the input and output conical members present varying respective diameters on a given cross section therebetween lying on a plane that is perpendicular to respective centerlines of the input and output conical members. An input sprocket is generally ring-shaped and forms a central opening and has a plurality of teeth along its outer periphery. An output sprocket is generally ring-shaped and forms a respective central opening and has a plurality of teeth along its respective outer periphery. A chain extends around the input and output sprockets and is meshed with the respective pluralities of teeth. During operation, the input and output sprockets are disposed on the plane such that an inner peripheral portion of the input sprocket engages the input conical member and an inner peripheral portion of the output sprocket engages the output conical member. The input and output sprockets, along with the chain, operate to synchronize a rotation of the input shaft with the output shaft by transferring rotational motion from the input shaft, to the input cone member, to the input sprocket, to the output sprocket via the chain, to the output cone member and to the output shaft. A gear ratio between the input and output shafts is determined based on an axial location of the plane along the centerlines.

In yet another aspect, the disclosure describes a method for operating a continuously variable transmission to provide a gear ratio between an input shaft and an output shaft. The method includes rotating an input cone member with the input shaft, and frictionally engaging an inner peripheral portion of a cross section of an input sprocket with an outer surface of the input cone member, the cross section having an input diameter. The method further includes meshing a chain around the input sprocket, and meshing the chain with an output sprocket such that rotation of the input sprocket causes rotation of the output sprocket. In addition, the method includes frictionally engaging an inner peripheral portion of a cross section of the output sprocket with an outer surface of an output cone member, the cross section of the output sprocket having an output diameter. The output shaft is thus rotated when rotation of the input shaft causes a rotation of the input cone member, rotation of the input cone member causes rotation of the input sprocket, rotation of the input sprocket causes motion of the chain, motion of the chain causes rotation of the output sprocket, rotation of the output sprocket causes rotation of the output cone member, and rotation of the output cone member causes rotation of the output shaft. In accordance with the method, the gear ratio depends on a ratio of the input and output diameters.

DETAILED DESCRIPTION

The present disclosure relates to powertrains and, specifically, to a continuously variable transmission (CVT) for use in any type of application. For example, the CVT embodiments disclosed herein are suitable for use in vehicle powertrains such as passenger automobiles, trucks, machines and other land-based vehicles, as well as for other applications such as in marine propulsion systems, stationary machines, and the like. The particular applications to a machine described herein are equally applicable to other types of machines having different types of transmissions. Therefore, one exemplary application to a wheel loader is shown herein, but it should not be construed as limiting the scope of the disclosure or the claims.

Figure 1:
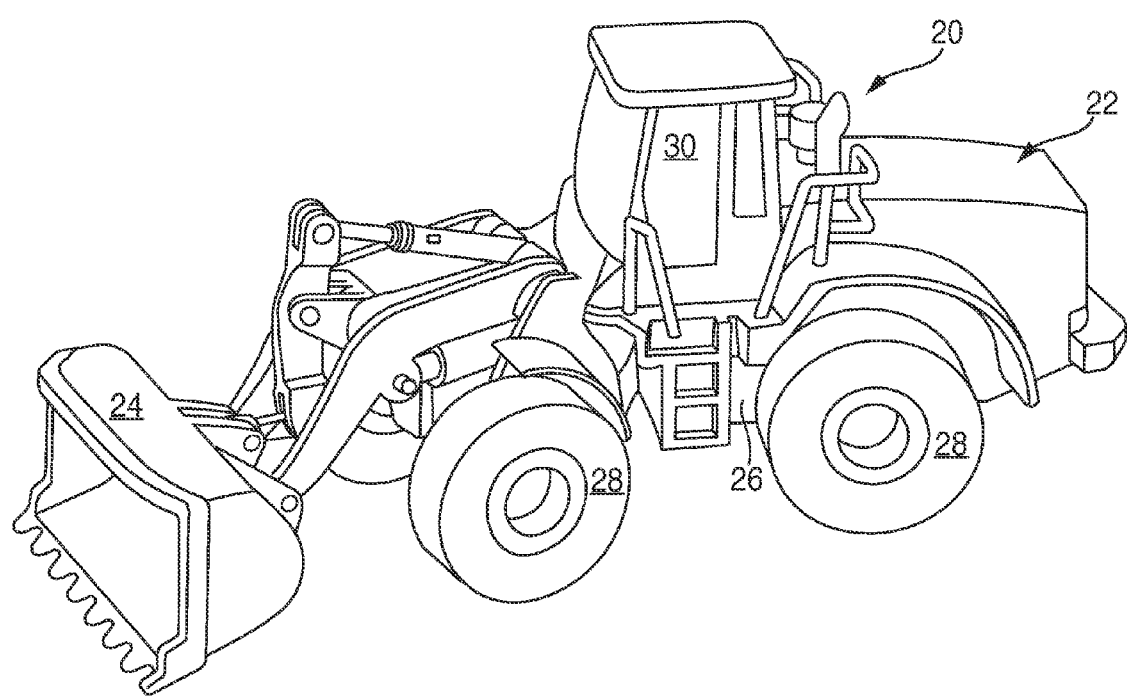
FIG. 1 is an outline view of a machine in accordance with the disclosure.

Referring now to the drawings, in which like reference numerals represent like parts throughout the several views, FIG. 1 shows a loader 20 in accordance with an embodiment. The loader 20 includes a vehicle portion 22 connected to a bucket or implement 24 on a front side of the vehicle portion 22. The vehicle portion 22 includes an articulated chassis 26, which is embodied here as a frame for the vehicle portion 22 that is typically formed from steel or other metal. The chassis 26 supports various parts of the loader 20, either directly or indirectly, such as an engine, body panels, hydraulic systems, and other parts. The chassis 26 itself is supported by a plurality of wheels 28 that are rotatably connected to the chassis 26. An operator occupies a cab 30, which is part of the vehicle portion 22 and is attached to an upper middle section of the chassis 26. As shown, the cab 30 is an enclosed structure that houses the operator of the loader 20 during operation. The various operator controls of the machine, which are not shown for simplicity, can include various pedals, levers, switches, sticks, and/or any other types of devices that the operator can use to control the motion of the machine and implements.

In the illustrated embodiment, the loader 20 has a bucket implement 24 located at a front portion thereof. The bucket 24 is made from metal and comprises two parabolic or similarly-shaped plates having a metal plate curved about the perimeter of each plate and extending horizontally between them so as to form a concave enclosure opening away from the loader 20. In general, the bucket may have any shape capable of holding a payload.

Figure 2:
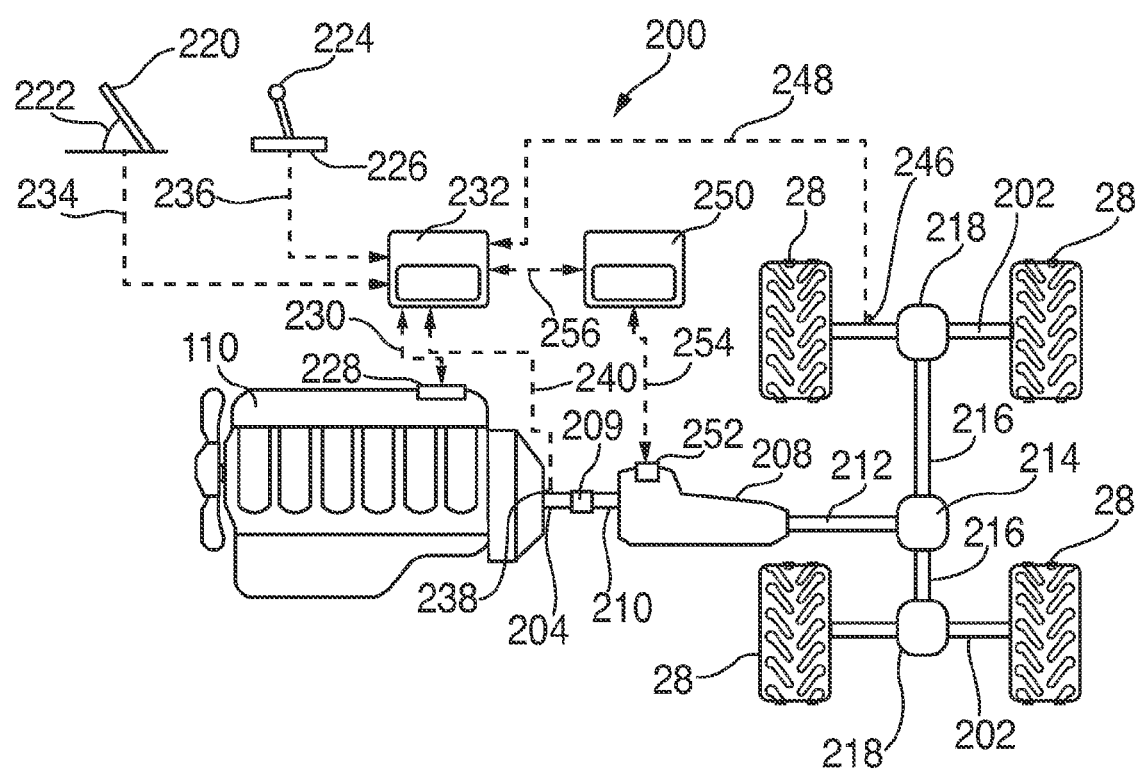
FIG. 2 is a schematic view of a power train for a machine in accordance with the disclosure.

FIG. 2 is a schematic of a powertrain 200 of the loader 20. The loader 20 includes two axles 202 connected to ground engaging members, in this case, the wheels 28. The chassis 26 also supports an engine 110, which has an output shaft 204 connected to a continuously variable transmission (CVT) 208 via a connecting shaft 210 and a coupling 209. An output shaft 212 of the CVT 208 is connected to a splitter 214 that powers two drive shafts 216, one for each axle 202. The CVT 208 is configured to selectively transform an engine speed and torque provided from the engine 110 at the connecting shaft 210 to a variable speed and torque at the output shaft 212, which is then applied to drive the ground engaging members or wheels 28.

Each drive shaft 216 transmits power to the wheels 28 via a respective differential 218 such that rotational power provided at the engine output shaft 204 is effectively transmitted to the wheels 28. Although two driven axles 202 are shown, a single axle or more than two axles may be used depending on the type of vehicle. Moreover, although wheels are shown, other types of ground engaging members, such as tracks, may be used.

The operator cab 30 houses various machine control devices, as previously described. As shown in FIG. 2, such devices can include an accelerator pedal 220 having an accelerator pedal sensor (APS) 222, and a gear selector lever 224 having a lever encoder 226. The APS 222 and lever encoder 226 may be configured to provide signals indicative of the desired ground speed of the loader 20 that is commanded by an operator during use.

The engine 110 has an interface 228 that is connected to a communication channel 230 with an engine controller 232. The engine controller 232 operates to monitor and control the function of various engine systems, such as monitor sensor readings from various engine sensors, control engine speed and load output and so forth, by receiving information and transmitting commands to various engine components through the communication channel 230. As shown, the engine controller 232, or another controller connected to the controller 232, is further connected to various vehicle components that can control the operation of the engine.

The controller or governor 232 is an electronic controller that includes a processor operably associated with other electronic components such as a data storage device and the various communication channels. In the illustration of FIG. 2, a throttle communication channel 234 and a gear ratio selection encoder communication channel 236 are connected to the controller 232 and configured to provide to the controller 232 information indicative of the operator's commands, such as the desired engine speed or load, the desired forward or reverse travel direction of the machine, a "neutral" or "park" setting of the machine transmission, and the like. A further indication by the operator such as an upshift, downshift, clutch lock, clutch unlock and other signals, as appropriate for the type of transmission used, can be provided. It should be appreciated that additional or alternative connections between the controller 232 and the various engine and/or vehicle systems may be present but are not shown for simplicity.

The controller 232 is further configured to receive information indicative of the operation of the remaining portion of the powertrain and implement system 200. In this way, the controller 232 is connected to an engine output shaft speed sensor 238 via an engine speed communication channel 240, to a vehicle ground speed sensor 246 via a ground speed communication channel 248, and to other sensors, which are not shown for simplicity.

The powertrain and implement system 200 further includes a transmission controller 250 that is configured to control the operation of the transmission 208. Accordingly, the transmission controller 250 is connected to an interface 252 of the transmission 208 via a transmission communication channel 254. The interface 252 may include structures that can selectively adjust the gear ratio of the CVT 208 in response to commands from the transmission controller 250 and/or the controller 232, as well as provide information to the transmission controller 250 indicative of the current gear ratio of the CVT 208, and other information, such as the power transmitted to the wheels 28 through the transmission 208, the speed of the output shaft 212, the speed of the connecting shaft 210, and the like. During operation, the transmission controller 250 may command gear ratio changes to the CVT 208 based on predetermined connecting shaft speed thresholds for upshift and downshift changes.

Figure 3:
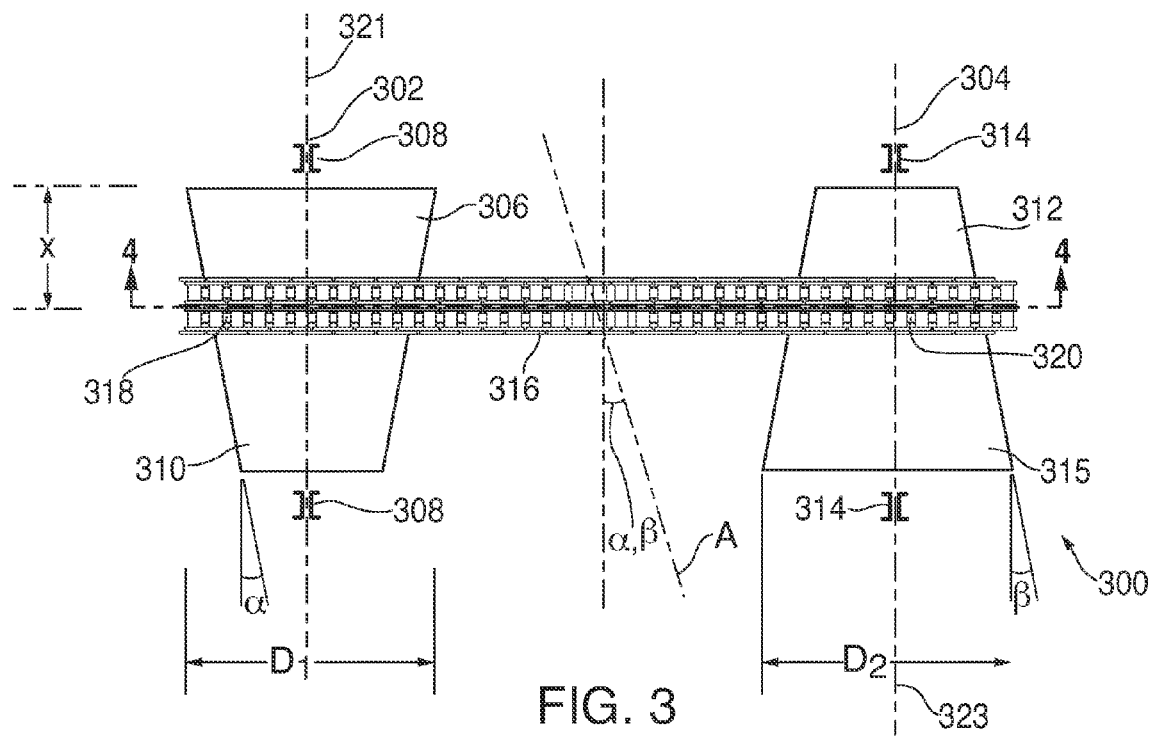
FIG. 3 is a partially fragmented schematic view of one embodiment for a continuously variable transmission in accordance with the disclosure.
Figure 4:
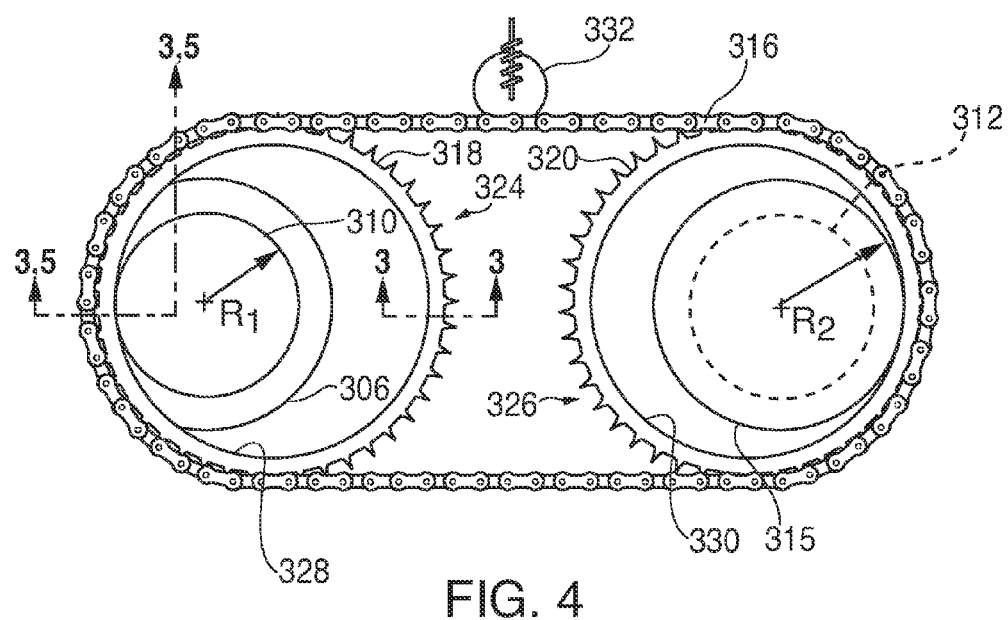
FIG. 4 is a fragmentary view of the continuously variable transmission of FIG. 3.
Figure 5:
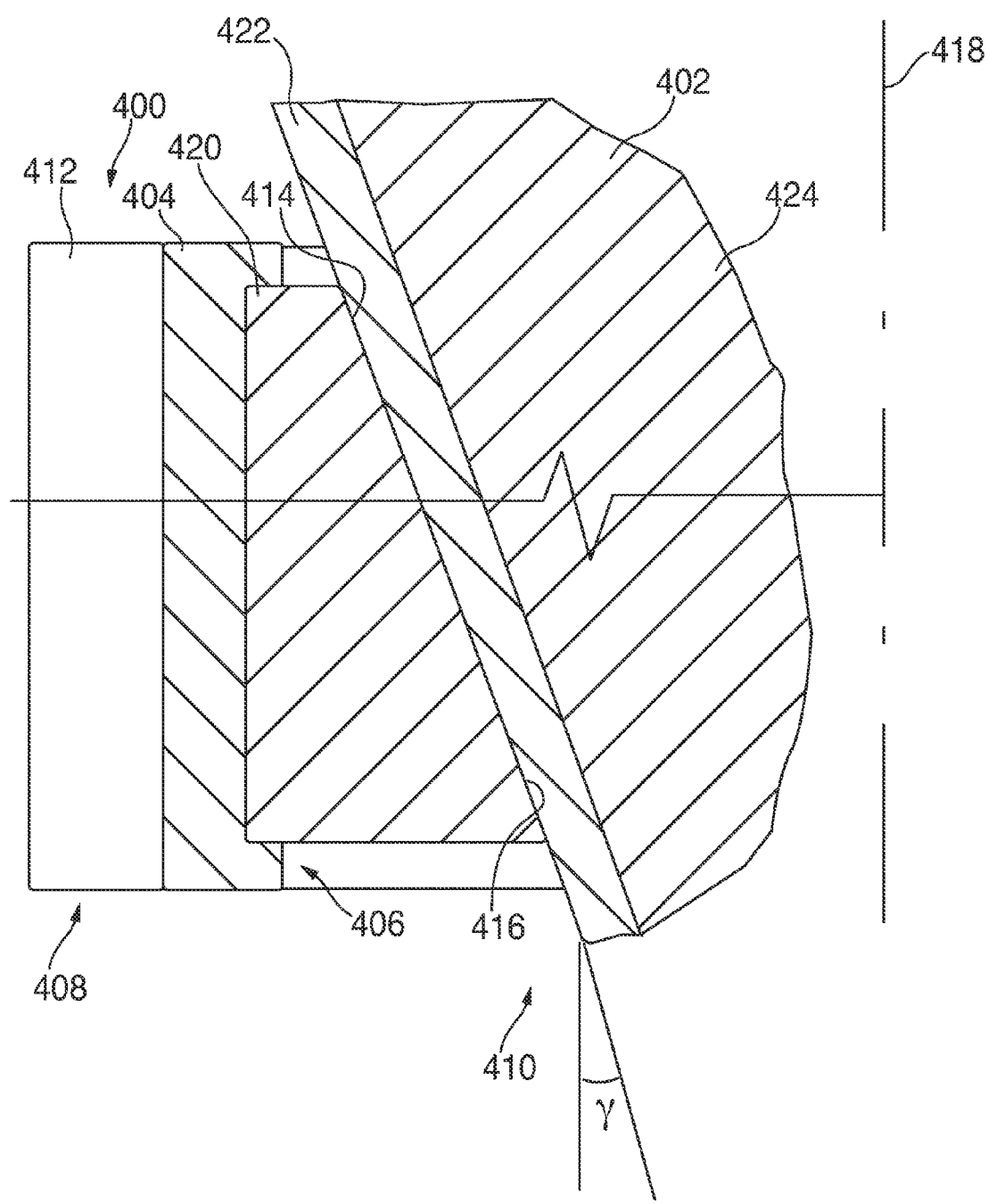
FIG. 5 is a detail fragmentary schematic view of the continuously variable transmission of FIG. 4.

One embodiment for a CVT 300, which can be used, for example, in the CVT 208 in the powertrain 200 (FIG. 2) is shown in FIGS. 3-5 from various perspectives. In reference to these figures, the CVT 300 uses a two-cone arrangement to transfer motion between an input shaft 302 and an output shaft 304. The input shaft 302 is connected to and rotates in unison with an input cone 306 having a base diameter, $D_1$. The inlet cone 306 has a generally frusto-conical shape at a cone angle, a. The input shaft 302 and input cone 306 are rotatably supported by bearings 308, which may be mounted on a frame or housing (not shown) enclosing the transmission 300. In one embodiment, the input cone 306 may be made as a composite structure that includes a frictional material such as rubber covering an outer surface 310 thereof, or may alternatively be made from a single material such as metal.

Similar to the input arrangement, the output shaft 304 is connected to and rotates in unison with an output cone 312 having a base diameter, $D_2$. The output shaft 304 and output cone 312 are rotatably supported by bearings 314, which may be mounted on a frame or housing (not shown) enclosing the transmission 300. The outlet cone 312 has a generally frusto-conical shape at a cone angle, β. In the illustrated embodiment, the cone angles α and β of, respectively, the input and output cones 306 and 312, are the same, but in alternate embodiments the input and output cone angles can be different depending on the desired gear ratios. Moreover, either the input or output cone can be formed as a cylinder instead of a cone, i.e., have a cone angle of 0 degrees. In one embodiment, the output cone 312 may be made as a composite structure that includes a frictional material such as rubber covering an outer surface 315 thereof, or alternatively be made from a single material such as metal or another appropriate material. Additional structures (not shown) may be associated with the output shaft to reverse direction of rotation or disengage rotation to park the vehicle, as is known.

The transmission 300 further includes a chain 316 that harmonizes rotation of two sprockets, an input sprocket 318 and an output sprocket 320. The input sprocket 318 is rotatably mounted in a casing (not shown) and configured for linear displacement along a centerline 321 of the input cone 306 or, alternatively, a line following the angle of the cone, such that an inner peripheral portion of the input sprocket 318 maintains contact with the outer surface 310 of the input cone 306. The chain 316 extends around the input sprocket 318 and engages teeth 324 that are formed on an outer periphery of the input sprocket 318 such that the chain 316 moves as the sprocket rotates. The chain 316 further extends around the output sprocket 320 and engages teeth 326 formed on an outer periphery thereof such that rotation of the input sprocket 318 is transferred, via the chain 316, to a rotation of the output sprocket 320.

During operation, a frictional engagement between the outer surface 310 of the input cone 306 and an inner periphery 328 of the input sprocket transfers a rotating motion of the input shaft 302, through the input cone 306, to the input sprocket 318. Depending on a position, X, of the input sprocket 318 along the centerline 321, and thus a radius, $R_1$, of a cross section of the input cone 306 at the distance, X, a rotation at an input speed will be imparted to the input sprocket 318 by the frictional engagement between the sprocket and the cone. As can be appreciated, the rotational or angular speed of the input sprocket 318 can change as the distance, X, changes. In the illustrated embodiment, the input and output sprockets 318 and 320 lie on the same plane, onto which the chain also lies, and are arranged to move along an axis, A, that is coplanar with and disposed at an angle relative to the centerlines 321 and 323 of the cones 306 and 312 such that contact between the sprockets 318 and 320 with the cones 306 and 312 can be maintained while the distance X changes. As shown, the angle of the axis A can be selected as being either equal to α, β, or any angle in between. Alternatively, the sprockets 318 and 320 may be aligned along a plane that that is perpendicular to the axis A and disposed at an angle relative to the centerlines 321 and 323 that matches the angle of the cones.

In the embodiment shown in FIG. 4, the input and output sprockets 318 and 320 have the same external diameter such that a rotation speed of the output sprocket 320, which is transmitted to the output sprocket 320 from the input sprocket 318 via the chain 316, will match the rotation speed of the input sprocket 318. Of course, different size sprockets may be selected for the input and output sprockets to introduce an additional gear ratio to the transmission 300. A frictional engagement between the outer surface 315 of the output cone 312 and an inner periphery 330 of the output sprocket 320 transfers the rotational motion of the output sprocket 320 to the output cone 312 and, thus, to the output shaft 304. As can be seen from FIG. 3, the axial position X along the input and output cones 306 and 312 is maintained constant for a particular gear ratio but can be changed for different gear ratios. Depending on the position, X, of the input sprocket 318 along the centerline 321, and thus the position of the output sprocket 320 relative to the output cone 312, a radius, $R_2$, of a cross section of the output cone 312 at the distance, X, will change in an inversely proportional fashion to the radius $R_1$, in this way providing a wide range of gear ratios between the input and output shafts.

A rotation at an input speed will be imparted to the input sprocket 318 by the frictional engagement. As can be appreciated, the rotational or angular speed of the input sprocket 318 can change as the distance, X, changes. In the absence of slippage between the respective sprockets and cones, the rotation of the cones, and thus the input and output shaft will be synchronized and the relative speeds of the two will be according to a gear ratio determined by the distance, X, as the primary control parameter. A chain tensioner 332 is disposed to take up any slack and vibration in the chain 316 during operation.

A detailed, cross section view of an interface between a sprocket 400 with a cone 402 is shown in FIG. 5. The sprocket 400 may be any of the input and/or output sprockets 318 and/or 320 (FIG. 4). Likewise, the cone 402 may be any of the input and/or output cones 306 and/or 312. Only a portion of the sprocket 400 is shown in the enlarged view of FIG. 5. As shown, the sprocket 400 includes a base ring 404 having inner and outer peripheral portions 406 and 408 disposed around a central opening 410. The base ring 404 may be made from a relatively rigid material such as metal. A plurality of teeth 412 are formed symmetrically along the outer peripheral portion 408 as shown, for example, in FIG. 4, where the sprocket 318 is shown including a plurality of teeth 324.

During operation, the sprocket 400 is rotatably mounted and in frictional contact with the cone 402 such that rotation of the sprocket 400 and cone 402 can be synchronized via a frictional force acting tangentially on the sprocket 400 and cone 402 along a line interface 414 therebetween. As can be appreciated, the interface 414 can be modeled as a line, but may have a rectangular shape if the cone and/or sprocket material elastically yields along the interface under a contact force, or may alternatively have a point interface. In the illustrated embodiment, the interface 414 is a line interface that results from a slanted contact surface 416 disposed at an angle, y, with respect to a centerline 418 of the cone 402, which matches an angle of the cone 402. The surface 416 may have any other appropriate cross-section shape, for example, trapezoidal, rectangular, triangular, circular, and other shapes, each of which will affect the footprint of the interface 414. In an alternative embodiment, the inner periphery of the sprockets can be parallel to the chain to provide a full contact area that is equidistant from a centerline of the sprocket across the entire width of the sprocket when the sprocket is disposed at an angle equal to the cone angle with respect to the centerline of the cone.

To promote the efficient frictional association for motion transfer between the cone 402 and the sprocket 400, a frictional layer is disposed on each component along the interface 414. More specifically, a frictional ring 420 is attached to the base ring 404 along the inner peripheral portion 406. Likewise, a frictional layer 422 may be disposed over the cone 402. The frictional ring and layer 420 and 422 may be made from any appropriate material, for example, rubber, which can reduce slipping along the interface 414 during operation. The core or base material 424 for the cone within the frictional layer 422 may be made from any appropriate material such as metal or a composite material.

Figure 6:
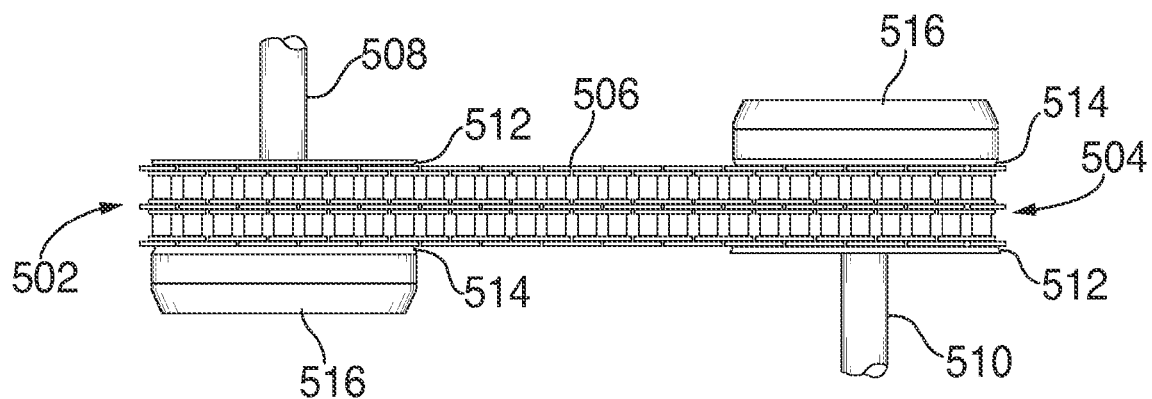
FIG. 6 is a schematic view of an alternative embodiment for a continuously variable transmission in accordance with the disclosure.

An alternative embodiment for a transmission 500 is shown in FIG. 6. The transmission 500 is similar in many respects to the transmission 300 (FIG. 3) in that two sprocket rings 502 and 504 are meshed together via a chain 506 to synchronize rotation between a driving element or input shaft 508 and a driven element or output shaft 510. In this embodiment, each of the input and output shafts 508 and 510 is associated with a respective double-cone arrangement that includes first and second cones 512 and 514, which are in opposed relation such that their respective apex portions are adjacent, their bases opposite, and both are disposed coaxially. An actuator 516, for example, a hydraulic actuator, is disposed to push and pull the first and second cones 512 and 514 towards or away from one another such that a gap 518 (FIG. 7) therebetween can be adjusted. For simplicity, the cones 512 and 514 associated with the sprocket 502 on the input shaft 508 of the transmission 500 are shown in FIG. 7, but it should be appreciated that the output side will be the same or substantially similar.

Figure 7:
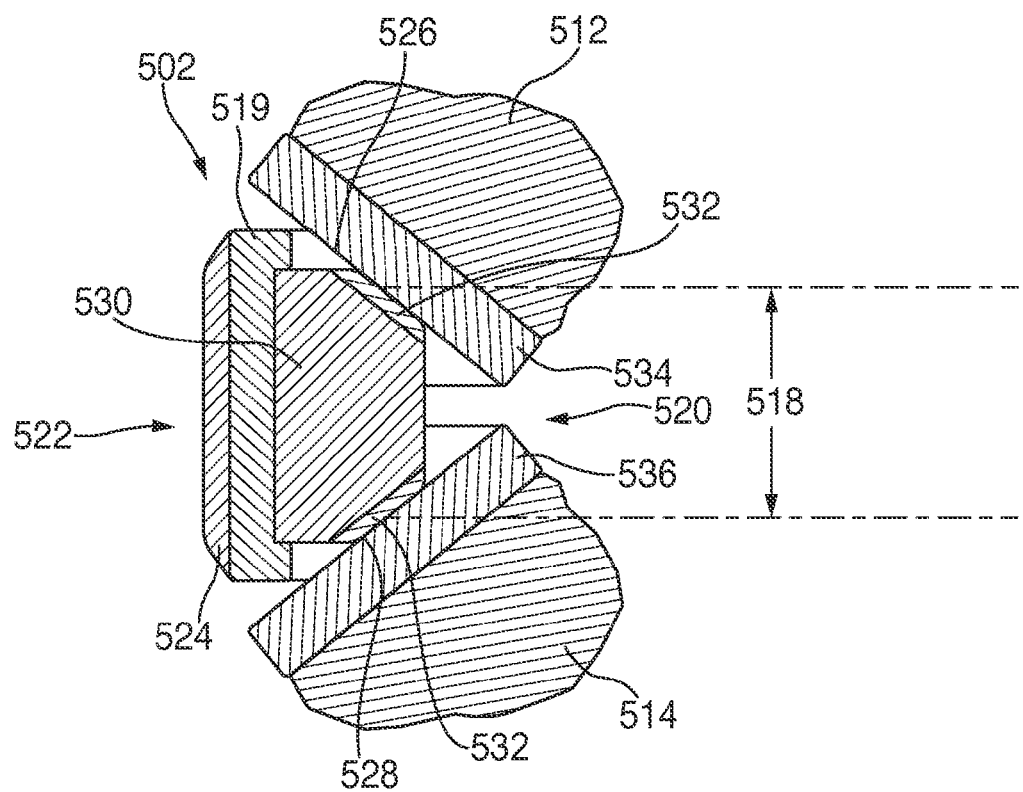
FIG. 7 is a detail fragmentary schematic view of the continuously variable transmission of FIG. 6.

A detailed, cross section view of an interface between the sprocket ring 502 and the first and second cones 512 and 514 is shown in FIG. 7. As shown, the sprocket ring 502 includes a base ring 519 having inner and outer peripheral portions 520 and 522 disposed around a central opening. The base ring 519 may be made from a resilient material such as metal and forms a plurality of teeth 524 that mesh with the chain 506. During operation, the sprocket ring 502 is rotatably mounted and in frictional contact with both the first and second cones 512 and 514 such that rotation of the sprocket ring 502 and the cones 512 and 514 can be synchronized via a frictional force acting tangentially therebetween along respective first and second line interfaces 526 and 528. As can be appreciated, the interfaces 526 and 528 can have any appropriate shape depending on the shape of the cooperating structures. In the illustrated embodiment, each of the first and second interfaces 526 and 528 is a line interface that results from a slanted contact surface of the sprocket ring 502 that is disposed at an angle that matches a corresponding angle of each of the first and second cones 512 and 514.

To promote the efficient frictional association for motion transfer between the sprocket ring 502 and the first and second cones 512 and 514, a frictional layer is disposed on each component, as previously described relative to the CVT 300 and shown in FIG. 5. In this embodiment, a backing ring 530 having a trapezoidal shape includes coated faces 532 that contact respective frictional layers 534 and 536 formed on the outer surface of each of the first and second cones 512 and 514.

INDUSTRIAL APPLICABILITY

The present disclosure is applicable to any type of machine or vehicle, including on- or off-highway vehicles, that have a powertrain that includes a device capable of varying an actual or equivalent gear ratio between a prime mover, for example, an engine, and ground engaging members, for example, wheels. In one disclosed embodiment, sprocket rings meshed with a chain cooperate with conically-shaped elements to provide infinitely adjustable equivalent gear ratios within a predetermined range in a transmission. A rotation of the sprockets and conical elements is synchronized by frictional contact therebetween. It is contemplated that, instead of sprockets meshed with a chain, the CVT in accordance with the disclosure can be implemented with ring-shaped hubs engaged with a belt.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A continuously variable transmission (CVT) comprising an input arrangement associated with an input shaft and an output arrangement associated with an output shaft, the CVT comprising:
    an input sprocket;
    an output sprocket connected to the input sprocket via a chain meshed with the input and output sprockets such that rotation of the input sprocket causes rotation of the output sprocket;
    an input cone member connected to the input shaft, disposed within a central opening of the input sprocket, and frictionally engaging an inner periphery of the input sprocket such that rotation of the input cone causes the input sprocket to rotate; and
    an output cone member connected to the output shaft, disposed within a central opening of the output sprocket, and frictionally engaging an inner periphery of the output sprocket such that rotation of the output sprocket causes rotation of the output cone member.

2. The CVT of claim 1, wherein at least one of the input cone member and the output cone member has a cylindrical shape.

3. The CVT of claim 1, wherein the input cone member includes two cone structures in opposing relation and configured along a single rotation axis, wherein a respective base of each cone structure is disposed on alternate sides of the input sprocket, and wherein the input sprocket is pinched between the two cone structures.

4. The CVT of claim 1, wherein the output cone member includes two cone structures in opposing relation and configured along a single rotation axis, wherein a respective base of each cone structure is disposed on alternate sides of the output sprocket, and wherein the output sprocket is pinched between the two cone structures.

5. The CVT of claim 1, wherein the input sprocket, the output sprocket and the chain are disposed on a single plane, the single plane being perpendicular to a plane containing each of an input cone member centerline and an output cone member centerline.

6. The CVT of claim 5, wherein the input sprocket, the output sprocket and the chain are configured to move together along an axis disposed at an angle relative to the input and output cone member centerlines.

7. The CVT of claim 6, wherein the angle is consistent with at least one of an input cone member angle and an output cone member angle.

8. The CVT of claim 7, wherein the angle is equal to the input cone member angle and the output cone member angle.

9. A continuously variable transmission (CVT) connected between an input shaft and an output shaft, comprising:
   a double-cone arrangement including an input conical member and an output conical member, the input and output conical members being disposed in parallel and having their respective bases on opposite ends such that the input and output conical members present varying respective diameters on a given cross section therebetween lying on a plane that is perpendicular to respective centerlines of the input and output conical members;
   an input sprocket being generally ring-shaped and forming a central opening and a plurality of teeth along an outer periphery thereof;
   an output sprocket being generally ring-shaped and forming a respective central opening and a plurality of teeth along a respective outer periphery thereof;
   a chain extending around the input and output sprockets and being meshed with the respective pluralities of teeth;
   wherein the input and output sprockets are disposed on the plane such that an inner peripheral portion of the input sprocket engages the input conical member and an inner peripheral portion of the output sprocket engages the output conical member, the input and output sprockets, along with the chain, operating to synchronize a rotation of the input shaft with the output shaft by transferring rotational motion from the input shaft, to the input cone member, to the input sprocket, to the output sprocket via the chain, to the output cone member and to the output shaft; and
   wherein a gear ratio between the input and output shafts is determined based on an axial location of the plane along the centerlines.

10. The CVT of claim 9, wherein the input and output sprockets have the same diameter.

11. The CVT of claim 9, wherein the input cone member includes two cone structures in opposing relation and configured along a single rotation axis, wherein a respective base of each cone structure is disposed on alternate sides of the input sprocket, and wherein the input sprocket is pinched between the two cone structures.

12. The CVT of claim 9, wherein the output cone member includes two cone structures in opposing relation and configured along a single rotation axis, wherein a respective base of each cone structure is disposed on alternate sides of the output sprocket, and wherein the output sprocket is pinched between the two cone structures.

13. The CVT of claim 9, wherein the input sprocket, the output sprocket and the chain are disposed on a single plane, the single plane being perpendicular to each of an input cone member centerline and an output cone member centerline.

14. The CVT of claim 13, wherein the input sprocket, the output sprocket and the chain are configured to move together along an axis disposed at an angle relative to the input and output conical member centerlines.

15. The CVT of claim 14, wherein the angle is consistent with at least one of an input conical member angle and an output conical member angle.

16. The CVT of claim 15, wherein the angle is equal to the input conical member angle and the output conical member angle.

17. A method for operating a continuously variable transmission to provide a gear ratio between an input shaft and an output shaft, comprising:
   rotating an input cone member with the input shaft;
   frictionally engaging an inner peripheral portion of a cross section of an input sprocket with an outer surface of the input cone member, the cross section having an input diameter;
   meshing a chain around the input sprocket;
   meshing the chain with an output sprocket such that rotation of the input sprocket causes rotation of the output sprocket;
   frictionally engaging an inner peripheral portion of a cross section of the output sprocket with an outer surface of an output cone member, the cross section of the output sprocket having an output diameter, and
   rotating the output shaft with the output cone member, such that:
     rotation of the input shaft causes a rotation of the input cone member;
     rotation of the input cone member causes rotation of the input sprocket;
     rotation of the input sprocket causes motion of the chain;
     motion of the chain causes rotation of the output sprocket;
     rotation of the output sprocket causes rotation of the output cone member; and
     rotation of the output cone member causes rotation of the output shaft;
   wherein the gear ratio depends on a ratio of the input and output diameters.

18. The method of claim 17, wherein the input cone member includes two cone structures in opposing relation and configured along a single rotation axis, and wherein a respective base of each cone structure is disposed on alternate sides of the input sprocket, the method further comprising pinching the input sprocket between the two cone structures.

19. The method of claim 17, wherein the input sprocket, the output sprocket and the chain are disposed on a single plane, and wherein the method further comprises changing the gear ratio by moving the single plane along the input and output cone members.

20. The method of claim 19, wherein moving the single plane is accomplished by moving the input and output sprockets in unison along an axis, the axis disposed one of parallel and at an angle relative to an input cone member centerline and an output cone member centerline.

* * * * *